United States Patent [19]

Naoi

[11] 4,424,540
[45] Jan. 3, 1984

[54] CASSETTE LOADING ASSEMBLY ESPECIALLY FOR USE IN VIDEO CASSETTE TAPE RECORDERS

[75] Inventor: Akira Naoi, Yaita, Japan

[73] Assignee: Sharp Kabushiki Kaisha, Osaka, Japan

[21] Appl. No.: 257,603

[22] Filed: Apr. 27, 1981

[30] Foreign Application Priority Data

Apr. 30, 1980 [JP] Japan ................................ 55-59160
Apr. 30, 2980 [JP] Japan ................................ 55-59162

[51] Int. Cl.³ ...................... G11B 15/66; G11B 25/06
[52] U.S. Cl. ..................................... 360/71; 360/93; 360/96.5
[58] Field of Search .............. 360/71, 96.1, 96.5–96.6, 360/93

[56] References Cited

U.S. PATENT DOCUMENTS 4,295,169 10/1981 Iwata et al. ............................ 360/93
4,308,562 12/1981 Negishi .................................. 360/71
4,319,292 3/1982 Katoh .................................. 360/96.5
4,320,424 3/1982 Murayama .............................. 360/71

FOREIGN PATENT DOCUMENTS 2836329 2/1980 Fed. Rep. of Germany ..... 360/96.5

*Primary Examiner*—Alfred H. Eddleman
*Attorney, Agent, or Firm*—Birch, Stewart, Kolasch & Birch

[57] ABSTRACT

A cassette loading assembly for VTR use is disclosed, wherein a cassette is inserted in the depth of a cassette chamber through an inlet port in the front of a VTR body carrying operation buttons, etc. and moved into operating position in a desired direction, for example, downwardly together with a cassette carrier for recording and reproducing TV pictures. The cassette loading assembly includes means for actuating a cassette carrier on which a cassette is mounted, means for supplying driving force for moving the cassette carrier, means for controlling the movement of the cassette carrier, and means for operating an operating item in association with the movement of the cassette carrier.

7 Claims, 22 Drawing Figures

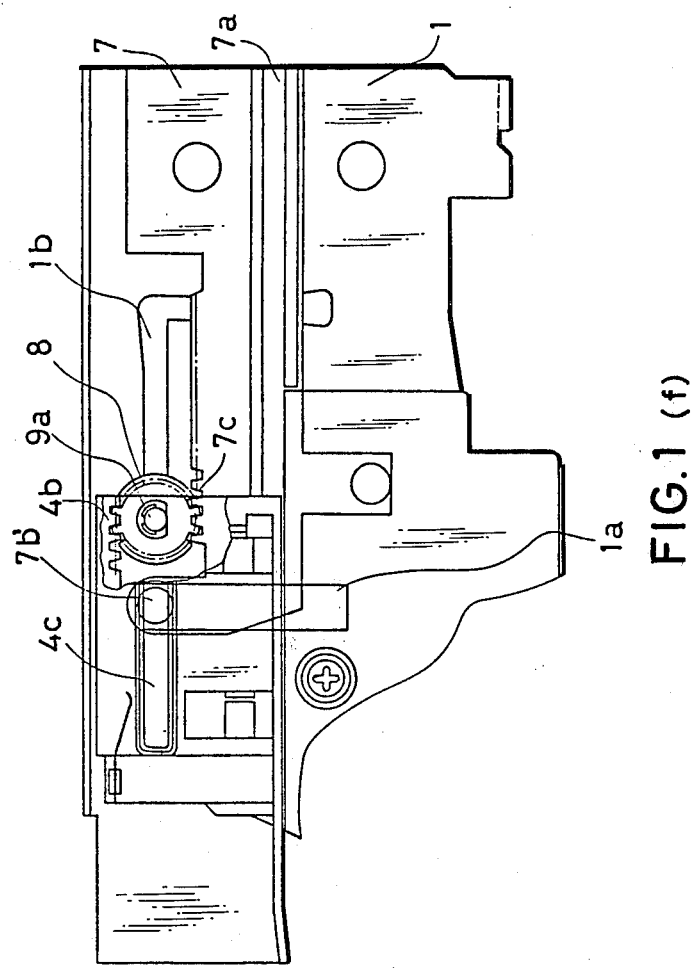

CASSETTE LOADING ASSEMBLY ESPECIALLY FOR USE IN VIDEO CASSETTE TAPE RECORDERS

BACKGROUND OF THE INVENTION

This invention relates to a structure for moving up and down a carrier for a cassette suitable for use in a cassette loading assembly of a magnetic tape recorder and player.

In conventional magnetic tape recorders and players especially video tape recorders (called merely "VTR" hereafter), a boxlike carrier on whih a cassette is mounted is adapted to move up and down in relationship to a body of the VTR. After the carrier is raised up and loaded with the cassette, the cassette is housed into the body of the VTR and the VTR itself is placed into a ready state for a play mode or the like by pressing down the carrier. However, this arrangement permits mounting of the body of the VTR only at a location where there is a considerable amount of space allowance. The VTR with the above assembly is therefore available in a limited place.

OBJECTS AND SUMMARY OF THE INVENTION

Accordingly, it is an object of the present invention to provide a cassette loading assembly for VTR use wherein a cassette is inserted in the depth of a cassette chamber through an inlet port in the front of a VTR body containing operation buttons, etc. and moved into an operating position in a desired direction, for example, downwardly together with a cassette carrier for recording and reproducing TV pictures.

It is another object of the present invention to provide a cassette loading assembly for VTR use which comprises means for actuating a cassette carrier on which a cassette is mounted, means for supplying driving force for moving the cassette carrier, means for controlling the movement of the cassette carrier, and means for operating an operating item in association with the movement of the cassette carrier.

It is still another object of the present invention to provide a control mechanism which is suited for the above kind of control operations and is simple to manufacture and reliable to use.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
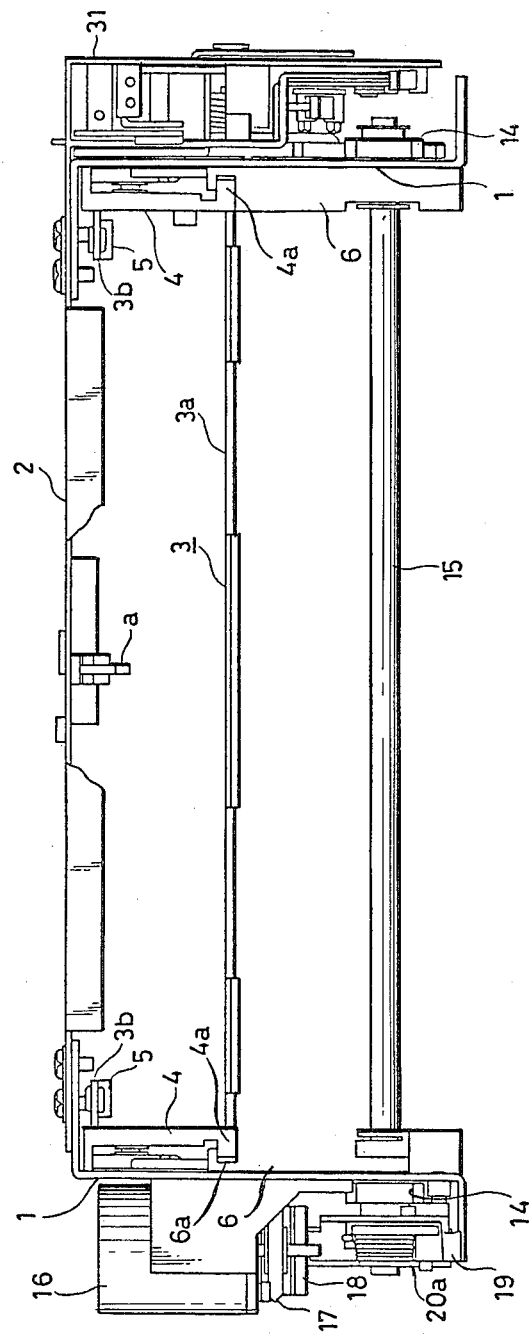
FIGS. 1(a) through 1(f) are a front view, a plan view, a left side view, a right side view, a right side view with a mount being removed and a cross-sectional view taken on the line A—A' all showing a cassette loading assembly according to an embodiment of the present invention.
Figure 1B:
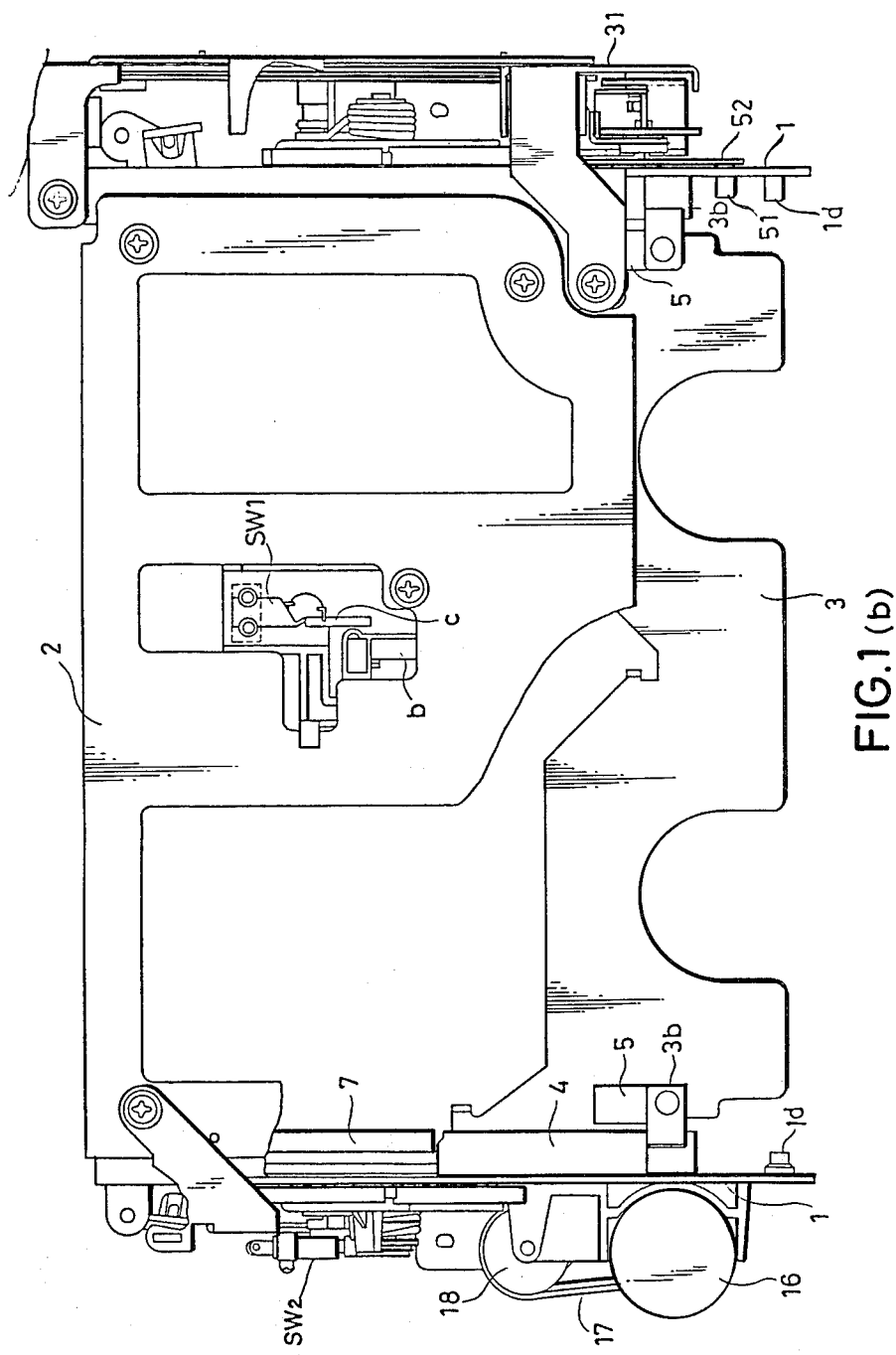
Figure 1C:
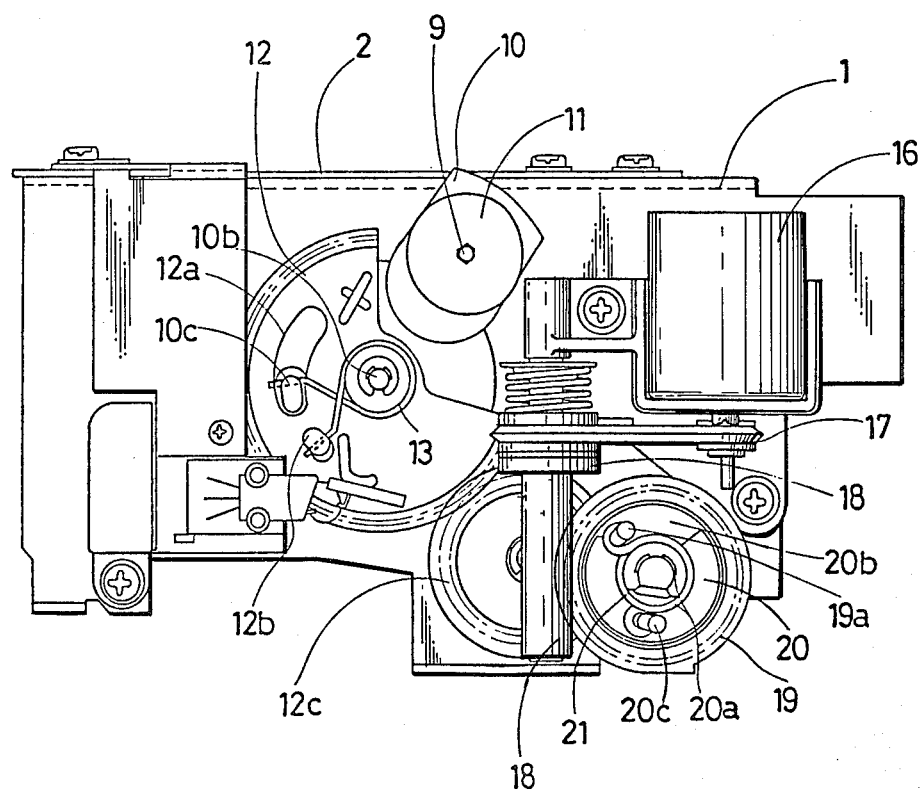
Figure 1:
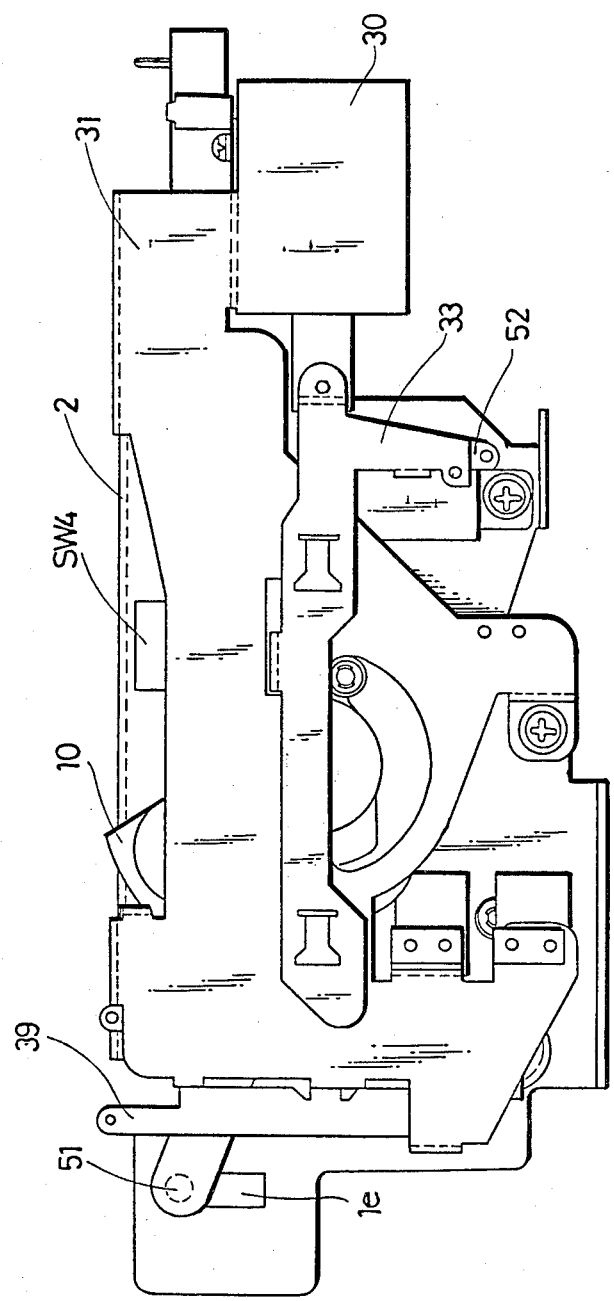
Figure 1:
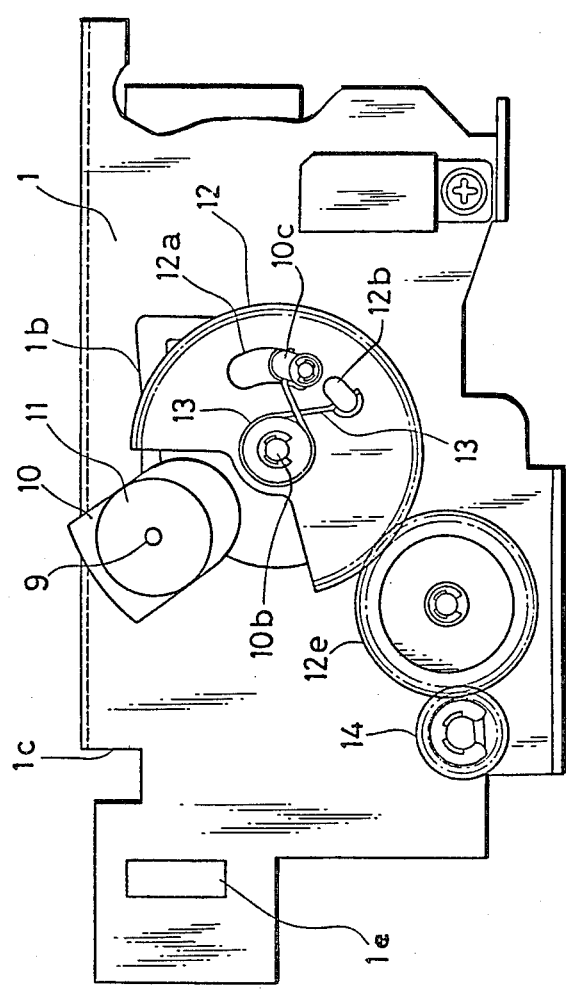
Figure 2:
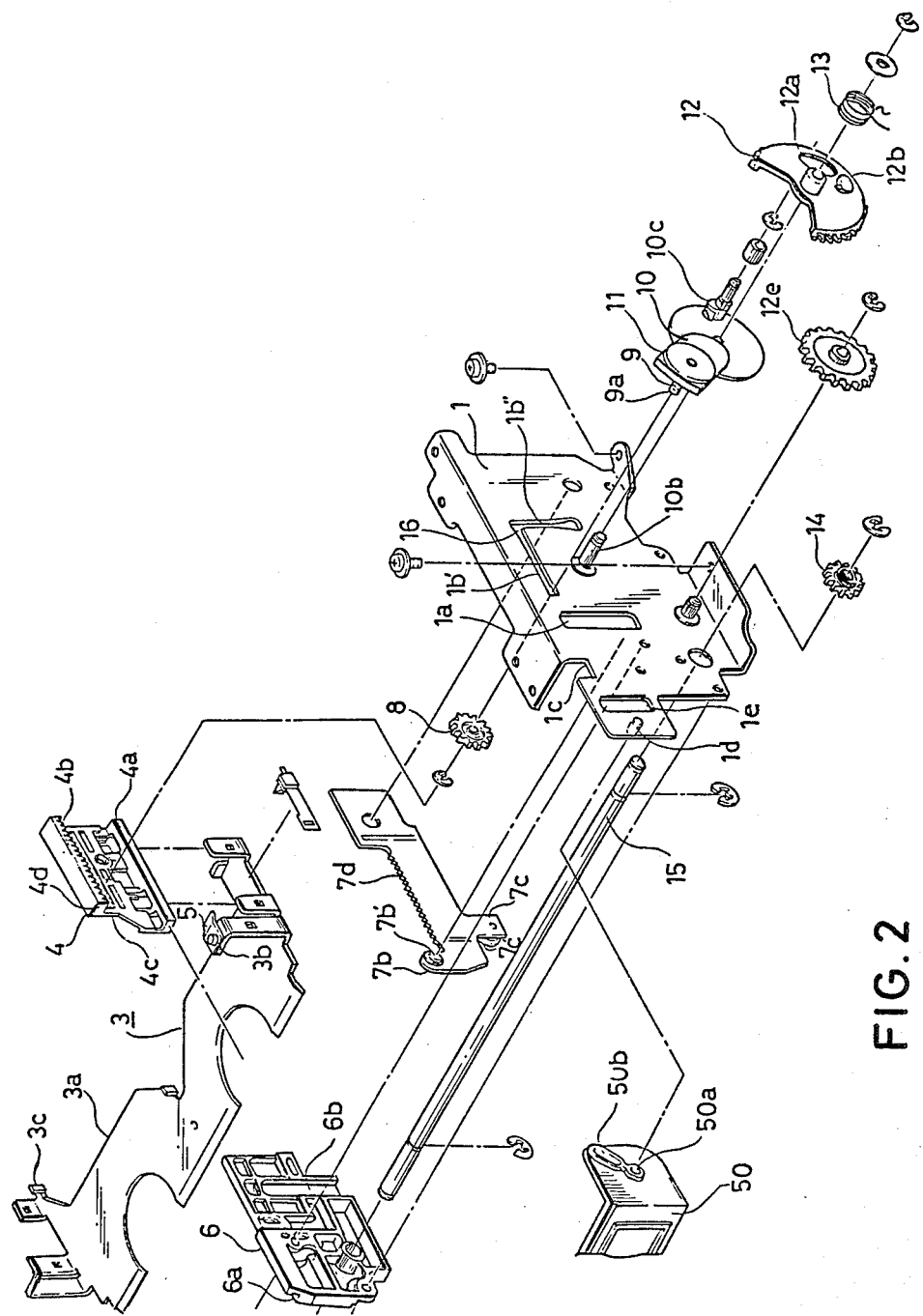
FIG. 2 is an exploded perspective view of a driving mechanism in the illustrated assembly.

FIGS. 1(a) through 1(f) illustrate, in a front view, a plan view, a left side view, a right side view, a right side view with a mount removed, and a cross-sectional view on the line A—A', a cassette loading assembly constructed according to an embodiment of the present invention. FIG. 2 illustrates in an exploded perspective view a driving mechanism used in the above assembly. FIGS. 3(a) through 3(e) illustrate the operation of the driving mechanism and FIG. 4 illustrates a driving source system.

An upper portion of the front of a VTR body carrying operation buttons, etc. is provided with a cassette inlet port (not shown) so that a cassette may be moved horizontally toward and back from the depth of a cassette chamber via the inlet port and thus inserted and removed into and out of the VTR body.

A pair of side plates 1, 1 is connected to each other by means of a top plate 2 to form a frame for the cassette loading assembly, which frame is mounted in place on a board of the VTR body by a well known fixing means. A cassette carrier 3 is held movable within the frame by use of a driving mechanism. The cassette carrier 3, when in position to be expose to the cassette inlet, grips the cassette placed into the cassette inlet.

The cassette carrier 3 is constituted by a flat bottom wall 3a and opposite standing side walls 4, 4 and shaped to receive the cassette and align the same in the desired position. Tip portions of an angle extending from the opposite sides of the bottom wall 3a are bent in opposite directions to form opposing edge portions 3b to which a leaf spring 5 is attached in a downwardly curved form so as to bias downwardly the cassette. Stops 3c, 3c are provided on rear side portions of the bottom plate 3a. While traveling on the carrier 3 backwardly, the cassette is flexibly urged downwardly by the leaf spring 5 and eventually comes into engagement with the stop 3c. Under the circumstance the cassette is held in proper position in regard to the cassette carrier 3. The side portion 4 has a horizontally extending guide boss 4a at its external lower portion.

Secured on a internal front portion of the side wall 1 is a fixed guide 6 having at an upper portion a horizontally extending guide groove 6a in which the guide boss 4a is slidably fitted. Furthermore, a movable guide 7 having at its lower portion a horizontally extending guide groove 7a for receiving the guide boss 4 is mounted slidably in an internal surface of the side wall 1 backwardly of the guide groove 6a. Furthermore, the front of the movable guide 7 is provided with an upwardly oriented boss 7b and a downwardly oriented boss 7c placed slightly behind the boss 7b, with the boss 7b having a columnar slide pin 7b' at its exterior surface and the boss 7c having a columnar slide pin 7c' at its interior surface. The side wall 1 has a downwardly extending guide groove 1a for receiving the slide pin 7b', whereas the fixed guide 6 has at its exterior surface or on the side wall side a downwardly extending guide groove 6b for receiving the slide pin 7c'. Since the slide pins 7b', 7c' are respectively slidable in the guide grooves 1a, 6b, the movable guide 7 is movable downwardly with regard to the side wall 1. With the movable guide 7 at its lowest position, the cassette is brought into operating position. On the other hand, with the movable guide 7 at its highest position, the guide groove 7a is flush with the guide groove 6a in the fixed guide 6 behind the same.

If the cassette carrier 3 is pushed backwardly under the condition where the guide boss 4a on its side wall 4 is fitted in the guide groove 6a, then the guide boss 4a comes into engagement with the guide groove 7a flush with the guide groove 6a. Should it be further pushed, the guide boss 4a moves out of the guide groove 6a and engages with only the guide groove 7a. As the movable guide 7 goes down under the circumstance, the carrier 3 also moves down, placing the cassette into operating position. At the moment where the guide groove 7a rises to be flush with the guide groove 6a, the cassette carrier 3 is returned forwardly so that the guide boss 4a comes into engagement with the guide groove 6a. It is noted that the fixed guide 6 is provided with a detector 6d' pivoted about a shaft 6d and a switch SW5 for preventing erasure error. The detector 6d' is forwardly rotated to actuate the switch SW5 in response to the downward movement of the cassette.

The cassette is forcedly moved in the following manner. A horizontally extending gear portion 4b is formed at the bottom of the externally entending boss on the upper portion of the side wall 1, a horizontally extending gear portion 7d is provided on the upper portion of the movable guide 7. A pinion 8 is interposed between the two gear portions 4b, 7d.

A shaft 9 holding the pinion 8 rotation has a free end 9a slidably fitting into a guide groove 4c provided in the side wall 4, extending in a horizontal direction slightly below the gear portion 4b, and a remaining end 9b passing through a guide groove 1b in the side wall 1 and running slidably through an opening 10a in a driving arm 10. A disk-shaped engaging member 11 is fixed on a tip portion of the remaining end 9b of the shaft 9 and held in slidable contact with an external surface of the driving arm 10.

The guide groove 1b consists of a backwardly extending horizontal segment 1b' and a downwardly extending vertical segment 1b'' connected to the rear end of the horizontal segment 1b', which groove facilitates the cross and vertical movement of the shaft 9. The driving arm 10 is used to forcedly slide the shaft 9 extending through the opening 10a along the guide groove 1b as it rotates. The arm 10 is mounted in place on the side wall 1 by means of a shaft 10b. Since the distance between the shafts 10b and 9 varies with rotation of the driving arm 10, the opening 10a is elliptic along the radial direction of the driving arm 10.

Figure 3:
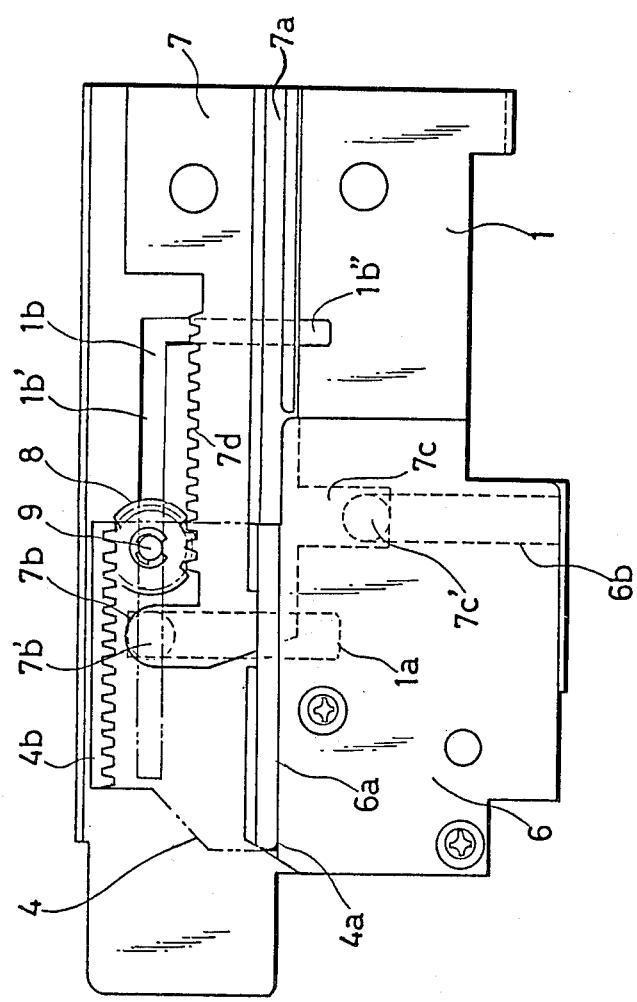
FIGS. 3(a) through 3(e) are cross-sectional views for explanation of the principal operation of the driving mechanism.
Figure 3:
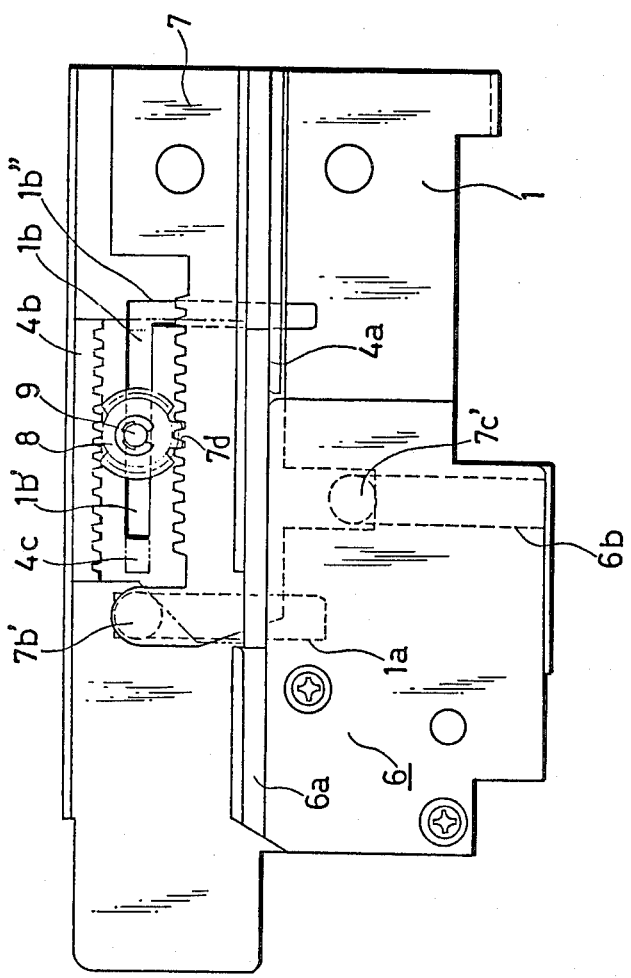
Figure 3:
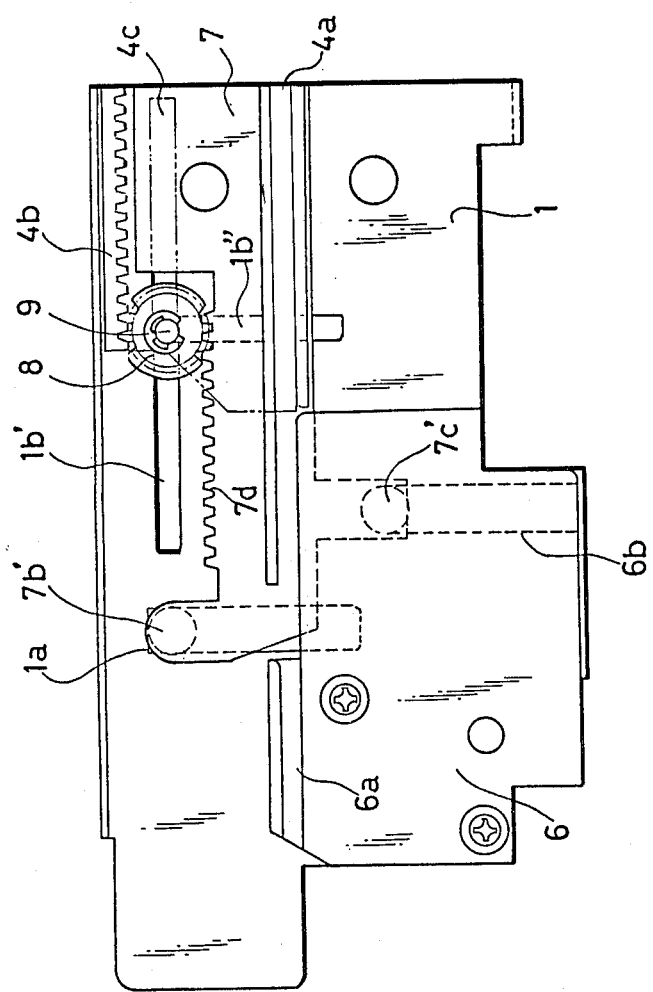
Figure 3:
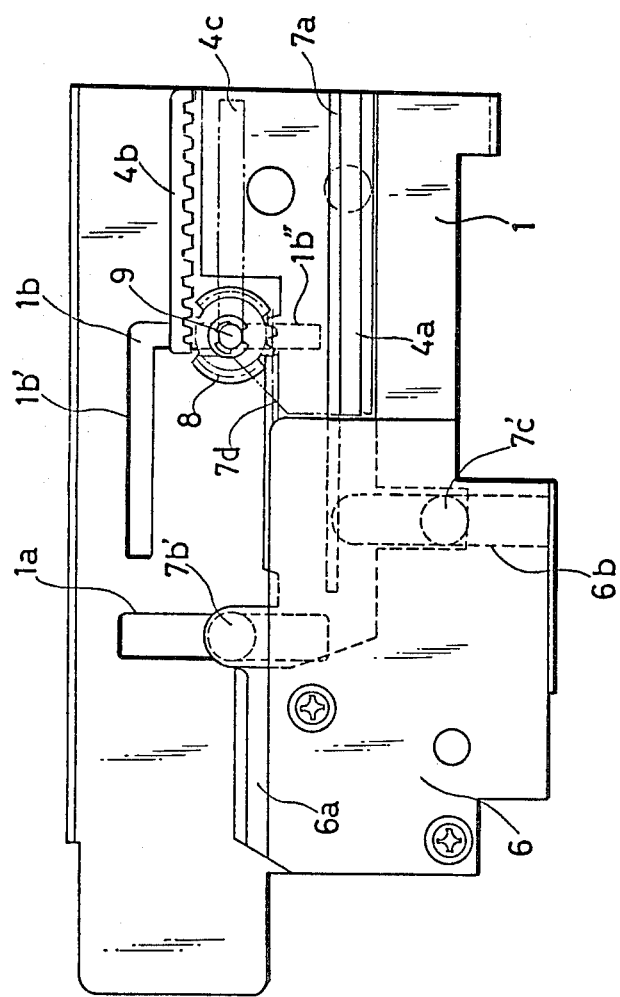
Figure 3:
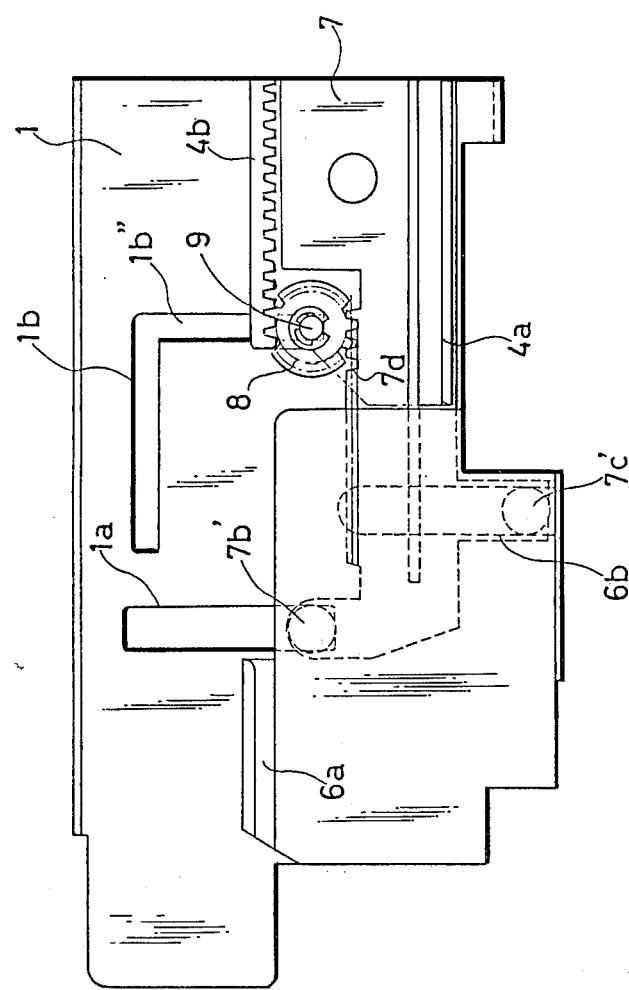
Figure 4:
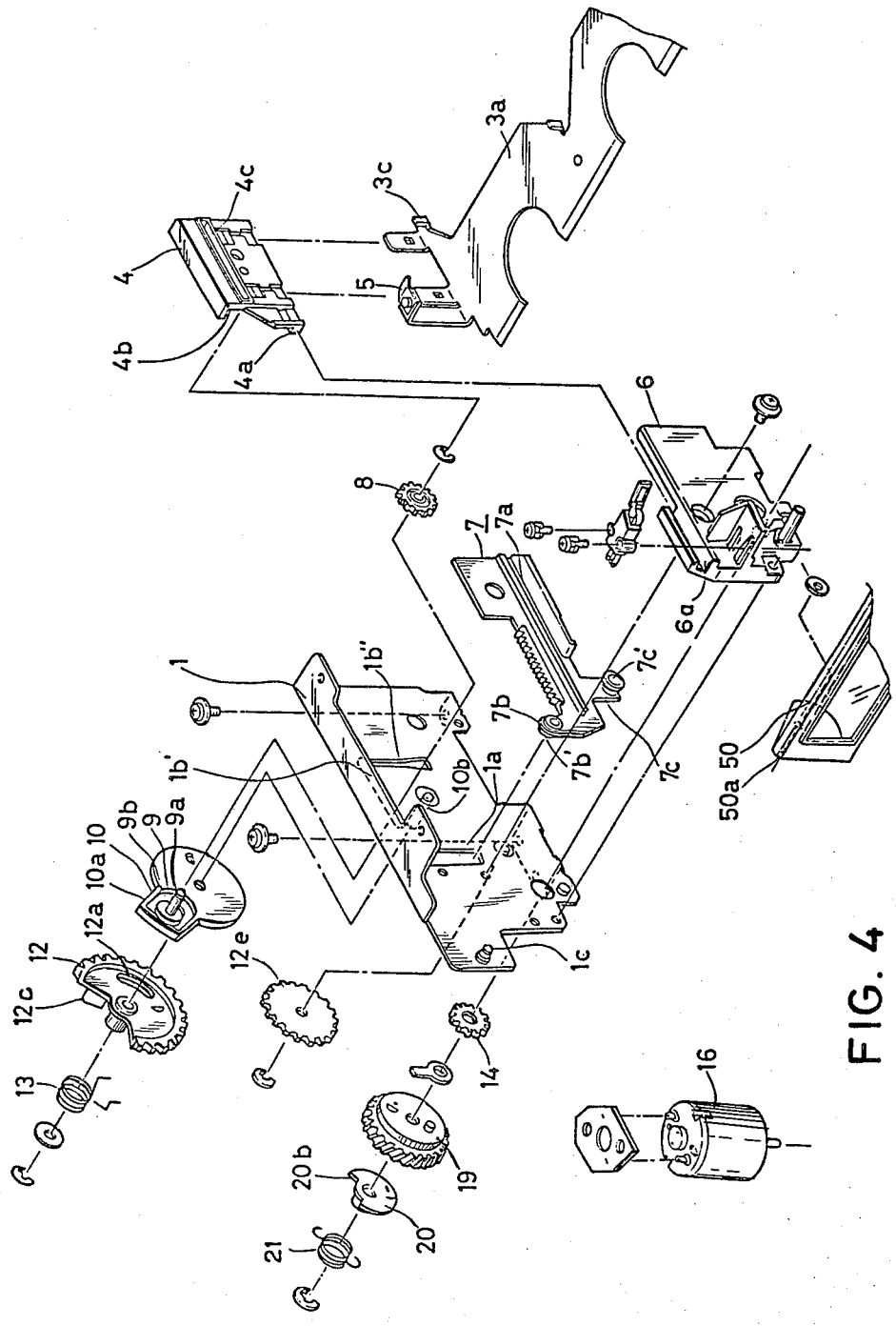
FIG. 4 is an exploded perspective view of a drive system used in the illustrated loading assembly.

Provided that the guide boss 4a on the side wall 4 of the cassette carrier 3 is received within the guide groove 6a and the pinion 8 is in meshing relationship with the rear end of the gear portion 4b and the front end of the gear portion 7d (as seen from FIG. 3(a)), the driving arm 10 forcedly rotates the shaft 9 backwardly along the horizontal segment 1b' (this is called "positive direction" hereafter). With the backward movement of the shaft 9 the pinion 9 moves backwardly and rotates with respect to the gear portion 7d which does not move backwardly. Accordingly, with the rotation of the pinion 9 the side wall bearing the gear portion 4b in meshing relationship with the pinion 9, in other words, the cassette carrier 3 moves backwardly as seen from FIG. 3(b).

If the cassette carrier 3 further moves backwardly, then the guide boss 4a comes into engagement with only the guide groove 7a in the movable guide 7 and the shaft 9 reaches the rear end of the horizontal segment 1b' as seen from FIG. 3(c). At this time the pinion is in alignment with the location where the rear end of the gear portion 7d meshes with the front end of the gear portion 4b and the free end 9a of the shaft 9 is in alignment with the rear end of the guide groove 4c.

Thereafter, if the driving arm 10 further continues rotating in the positive direction, then the shaft 9 permits lowering of the vertical segment 1b' and the cassette carrier 3 as seen from FIG. 3(d) so that the carrier 3 finally reaches the location whereby the cassette is brought into operating position as seen from FIG. 3(e). With the cassette in operation position, the driving arm 10 rotates in a direction opposite the positive direction so that the shaft 9 hoists the vertical segment 1b'' and moves forwardly the horizontal segment 1b' to its home position.

It is obvious in the art that the driving arm 10 may be rotated in the positive or negative direction either manually or by use of a motor which will be discussed below.

A gear 12 with an arc-shaped hole 12a and an outwardly extending boss 12b is mounted rotatable on the shaft 10b, while the driving arm 10 has a boss 10c slidably passing through the hole 12a. Opposite ends of a coil spring 13 coaxial with the shaft 10b are secured on the bosses 12b and 10c in a sense to position the bosses 12b and 10c closely with respect to each other.

In the case where the rotating force of the gear 12 is positive, it is exerted on the boss 10c via the spring 13 to rotate the driving arm 10 in the positive direction. On the other hand, in the case where the rotating force is negative, an edge portion of the hole 12a of the gear 12 abuts on the boss 10c to rotate the driving arm 10 in the negative direction. Under the condition where the gear 12 rotates in the positive direction to place the carrier 3 into an operating position, flexibility of the spring 13 effectively urges downwardly and aligns the cassette carrier 3 of the cassette.

A gear 14 is interlocked via a gear 12e with the gear 12 is held in such engaging relationship as to transmit force of rotation to a tip portion of the shaft 15 rotatably traversing front lower portions of the pair of the side walls 1. Transmission of force is carried out with a slight amount of allowance.

Each of the side walls 1, 1 is provided with a force driving system covering from the gear 14 to the gear portions 4b and 7d and a guide system for smoothing the movement of the side wall 4. As the shaft 15 rotates, a pair of the driving arms 10 is given force of rotation via the gears 14, thus driving the cassette carrier 3 from both sides.

One of the side walls 1 is provided with a worm 18 driven by a reversible motor 16 via a belt 17 and a worm wheel 19 meshing with the worm 18 is pivoted rotatably on the shaft 15. The worm wheel 19 has an outwardly extending boss 19a. Disposed on the periphery of the worm wheel is a link 20 having a shaft 20a for transmission of force of rotation to the tip portion of the shaft 15.

The link 20 is provided with a cut portion 20b to which the boss 19a is snugly fitted and adapted to rotate within the range of the cut portion with resepct to the worm wheel 19. The link 20 further has an outwardly extending boss 20c to which one end of a spring loaded around the shaft 20a is attached, with the remaining end thereof engaged with the boss 19a. Force of the spring 21 acts to rotate the link 20 in a direction opposite the driving arm 10. In this manner, the boss 19a of the worm wheel 19 is held in contact with the edge portion of the cut portion 20b of the link 20 under the influence of the spring 21. As the worm wheel 19 rotates, the link 20 also rotates to cause rotating of the driving arms 10. In inserting the cassette via the inlet port onto the carrier in an initial stage and pushing the same backwardly, force is applied to such an extent as to offset the force of the spring 21, urging the cassette carrier 3 against the spring.

Once the cassette has been placed onto the carrier 3, it is brought into operating position as follows. The motor 16 is rotated in the positive direction until the cassette reaches the operating position. In order to bring the cassette via the inlet port into the position where it is easily accessible and removable (that is, eject mode), the motor 16 is rotated in the reverse direction until the cassette reaches such an accessible position. A control circuit for the motor 16 may comprise in combination a rotation direction switching means for switching the direction of rotation of the motor 16 and position detecting means responsive to the movement of the carrier, as is obvious to the those skilled in the art.

Therefore, should the cassette be mounted on the carrier 3 and the motor 16 be rotated in the positive direction, the carrier 3 as well as the cassette travels backwardly a given distance by a driving force from the driving system and then downwardly a given distance. The cassette is placed into operating position as soon as the driving force is released. At this moment the spring 13 presses down the cassette carrier 3 bearing the cassette. Both are then locked in place through alignment means although not shown.

If the cassette is in an operating position and the motor 16 is rotated in the reverse direction, then the carrier 3 moves in a manner opposite to that discussed previously and set free of the reverse driving force when the cassette returns to the easily accessible position through the inlet port. Thus, the cassette may be dislodged from the VTR body.

Within the control circuit for the motor 16, position detecting means responsive to the position of the cassette, the cassette carrier or a force transmission system from the motor 16 to the cassette carrier may be properly implemented with first switch means consisting of one or more switches substantially in a conductive state until the cassette reaches the operating position during loading of the cassette and second switch means consisting of one or more switches substantially conductive until the cassette reaches the accessible position during ejecting of the cassette. The motor 16 becomes conductive upon insertion of the cassette onto the cassette carrier 3 and nonconductive when the cassette carrier reaches operating position so that the cassette may be automatically placed into operating position when the cassette is inserted into the carrier. The following will set forth an embodiment by which the cassette may be automatically placed into the operating position.

Substantially in the center of the top plate 2 there is provided a switch $SW_1$ which is turned ON as soon as the cassette is placed onto the carrier 3 and held in place by the stop 3c and moved back slightly as well as the carrier 3 against the spring 21. Once a free end of an oscillating plate a is pushed up by the cassette, an oscillating plate b whose inclined surface is pressed by the free end swings in a horizontal direction. The free end thereof urges an actuator plate c of the switch $SW_1$ in the same direction, turning ON the switch $SW_1$.

The switch $SW_1$ is held ON somewhere between the position where the cassette as well as the carrier moves somewhat backwardly and the position where it moves most backwardly. The switch is turned OFF when the cassette as well as the cassette carrier 3 moves down from the backmost position.

A switch $SW_2$ is provided outside one of the side walls 1. The switch $SW_2$ is turned ON before the cassette as well as the cassette carrier 3 moves down and the switch $SW_1$ is turned ON and turned OFF when operating position is reached.

An outwardly extending boss 12c is provided outside the transmission system, for example, the gear 12, facing against an actuator plate $a_2$ of the switch $SW_2$. The boss 12c pushes down the actuator plate $a_2$ and turns ON the switch $SW_2$ when the cassette on the carrier 3 reaches operating position. The switch $SW_2$ is of a so-called normally closed type. There is further provided a boss 12d which pushes down the actuator plate $a_2$ of the switch $SW_2$ before the cassette is seated on the carrier 3 and the switch $SW_1$ is turned ON.

Figure 5:
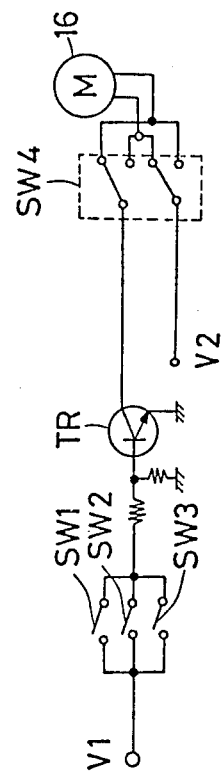
FIG. 5 is a circuit diagram of an example of basic structure of a control circuit.

FIG. 5 shows an example of the motor control circuit. The base of a transistor TR is connected to a power source $V_1$ via a parallel circuit of the above mentioned switches $SW_1$ and $SW_2$, with the collector thereof being connected to a rotation direction switch $SW_4$ and the motor 16 is connected to a power source $V_2$.

Figures 6A, 6B:
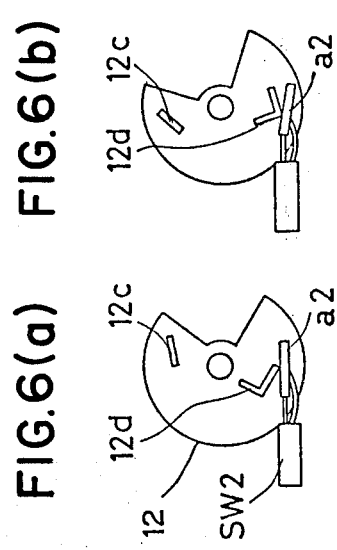
FIGS. 6(a) through 6(e) are views for explanation of the operation of a switch.

FIGS. 6(a) through 6(f) depict the relationship between the switch $SW_1$ and the gear 12. FIG. 6(a) shows the situation prior to the cassette being seated on the carrier 3 and where the switch $SW_1$ is OFF and the switch $SW_2$ is also OFF with its actuator plate $a_2$ being pressed by the boss 12d.

Assume now that the cassette is inserted onto the carrier 3 and is moved backwardly as well as the carrier 3 against the force of the spring 21. The switch $SW_1$ is pushed and rendered ON by the cassette, while the switch $SW_2$ is held OFF by the boss 12d, as viewed from FIG. 6(d). The switch $SW_1$ in the ON position turns ON the transistor TR and the motor 16 is energized with the power supply $V_2$ via the changeover switch $SW_4$ and rotated in the positive direction. It is noted that the switch $SW_4$ is normally connected as depicted by the solid line and rotates in the positive direction.

The cassette as well as the cassette carrier 3 moves backwardly upon positive rotation of the motor 16. When the cassette reaches the backmost position, the switch $SW_1$ is still ON and the switch $SW_2$ is also ON with its actuator plate $a_2$ being depressed by the boss 12d as seen from FIG. 6(c). If the cassette resting on the carrier 3 is lowered with rotation of the motor 16, then the switch $SW_1$ is no longer depressed by the cassette so that it is turned OFF. The switch $SW_2$, on the other hand, is ON as seen from FIG. 6(d) since the actuator plate $a_2$ is not depressed.

Figures 6C, 6D, 6E:
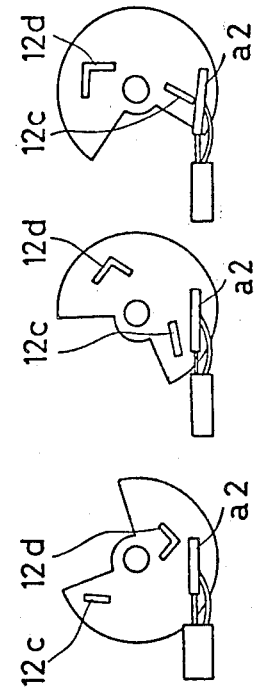

If the cassette on the carrier 3 falls to the operating position, then the switch $SW_1$ is OFF and the switch $SW_2$ is also OFF with its actuator plate a being pressed by the boss 12c as seen from FIG. 6(e) so that the motor 16 is deenergized. Once the cassette as well as the carrier 3 has been placed into operating position, the VTR body is ready for playing and recording. The cassette is held in the proper place under the influence of the spring 13. In this manner, the cassette is placed into the operating position automatically upon insertion of the cassette into the carrier 3.

Should a switch for turning ON the transistor TR be constituted by a self-sustaining switch which is turned ON in response to switching ON of the switch $SW_1$, for example, and thereafter maintains its ON state, it is possible to control the self-sustaining switch by a switch $SW_2'$ which is turned OFF to render the self-sustaining switch OFF only in response to the boss 12c, for example, when the cassette on the carrier 3 reaches the operating position.

In order to achieve ejection of the cassette, a switch $SW_3$ is connected in parallel with the switch $SW_1$, for example, and the switch $SW_4$ is switched to the reverse rotation side in response to an ejection instruction, thus switching ON the switch $SW_3$. This situation is released when the cassette reaches the accessible position. With such an arrangement, the cassette resting on the carrier 3 is elevated in response to the ejection instruction. The motor 16 is deenergized when the cassette moves forwardly to the accessible position, whereupon it is easily removable.

Figure 7:
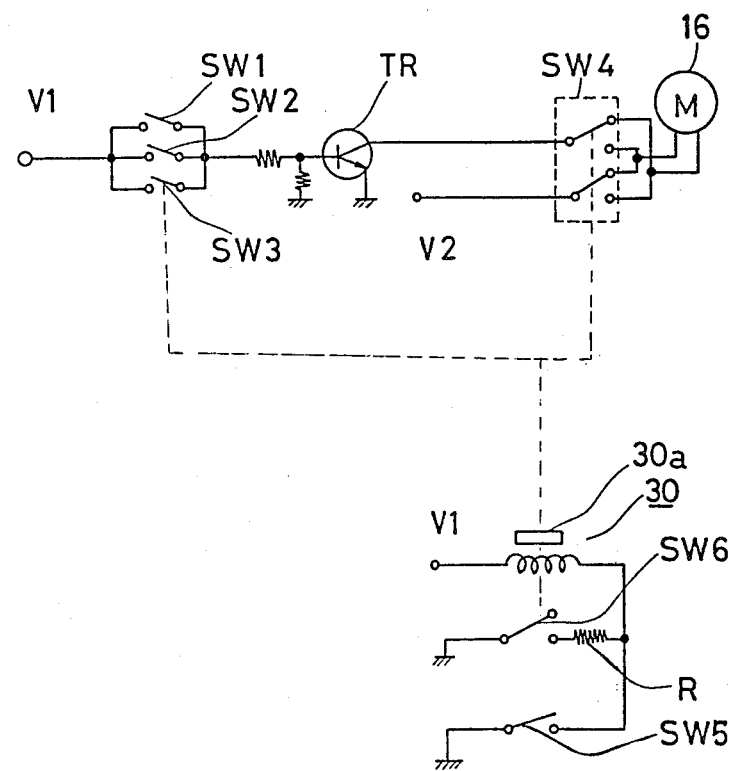
FIG. 7 is a circuit diagram of a control circuit using the basic concept of FIG. 5.
Figure 8A:
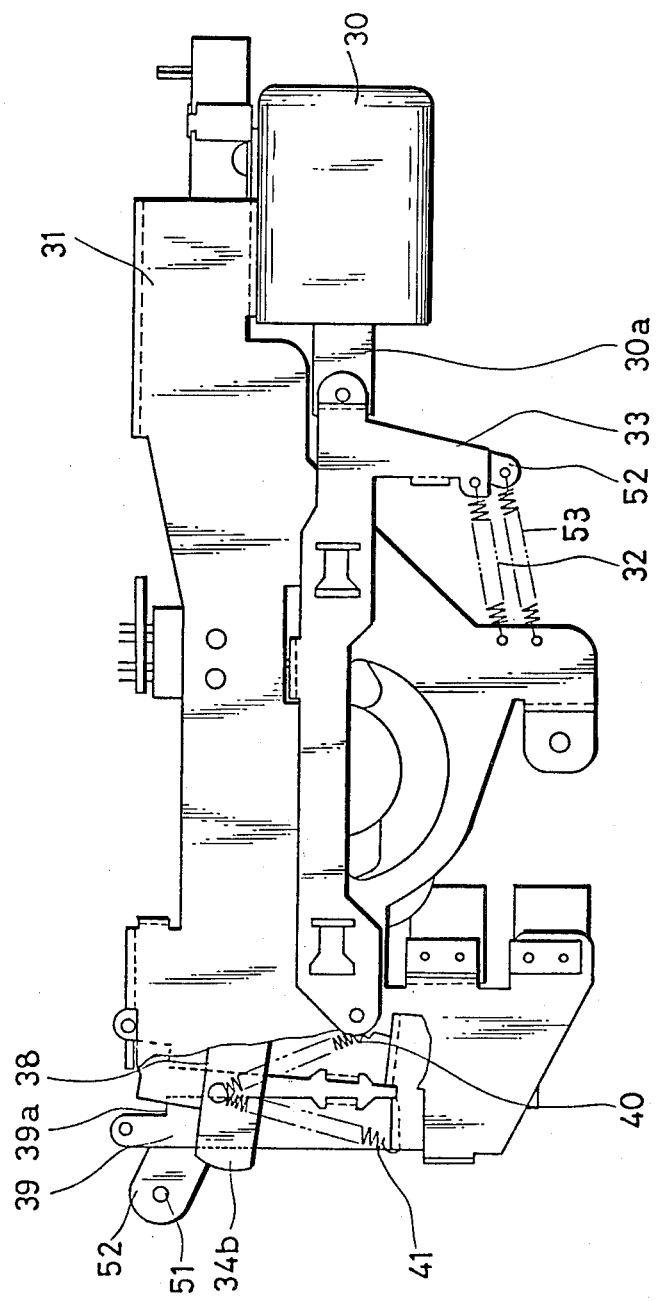
FIGS. 8(a) and 8(b) are a left side view and a right side view of a cassette ejecting assembly added to the illustrated embodiment.
Figure 8B:
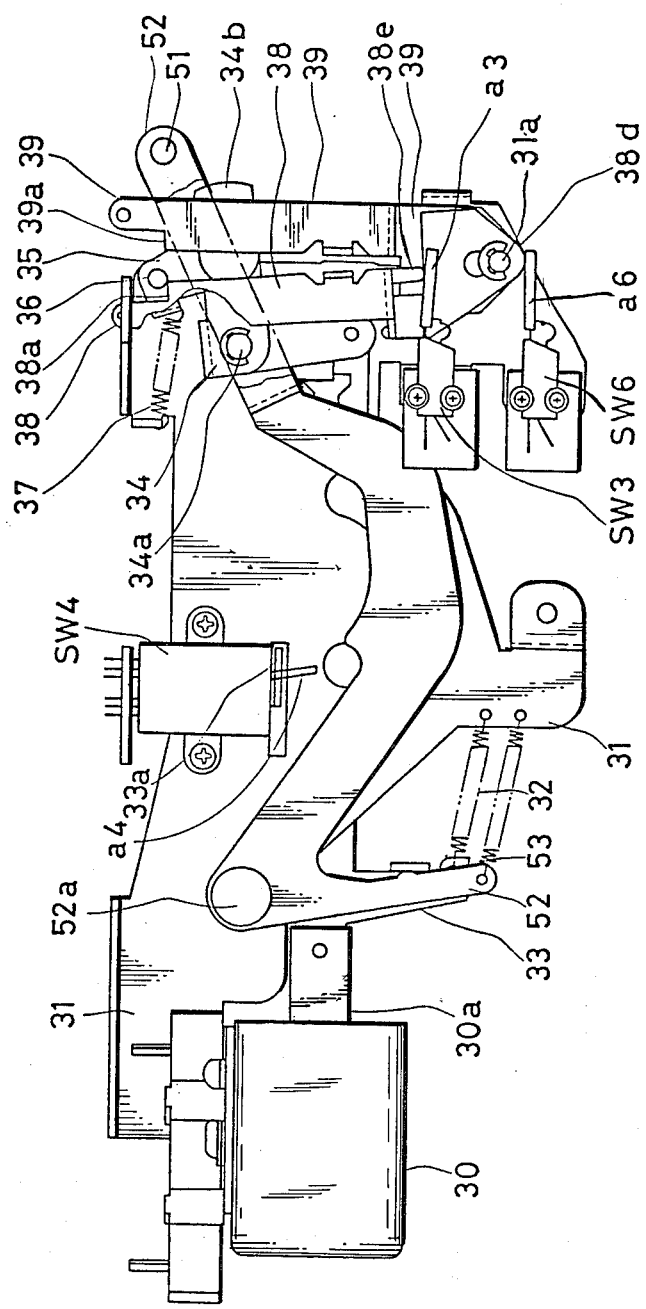
Figure 9:
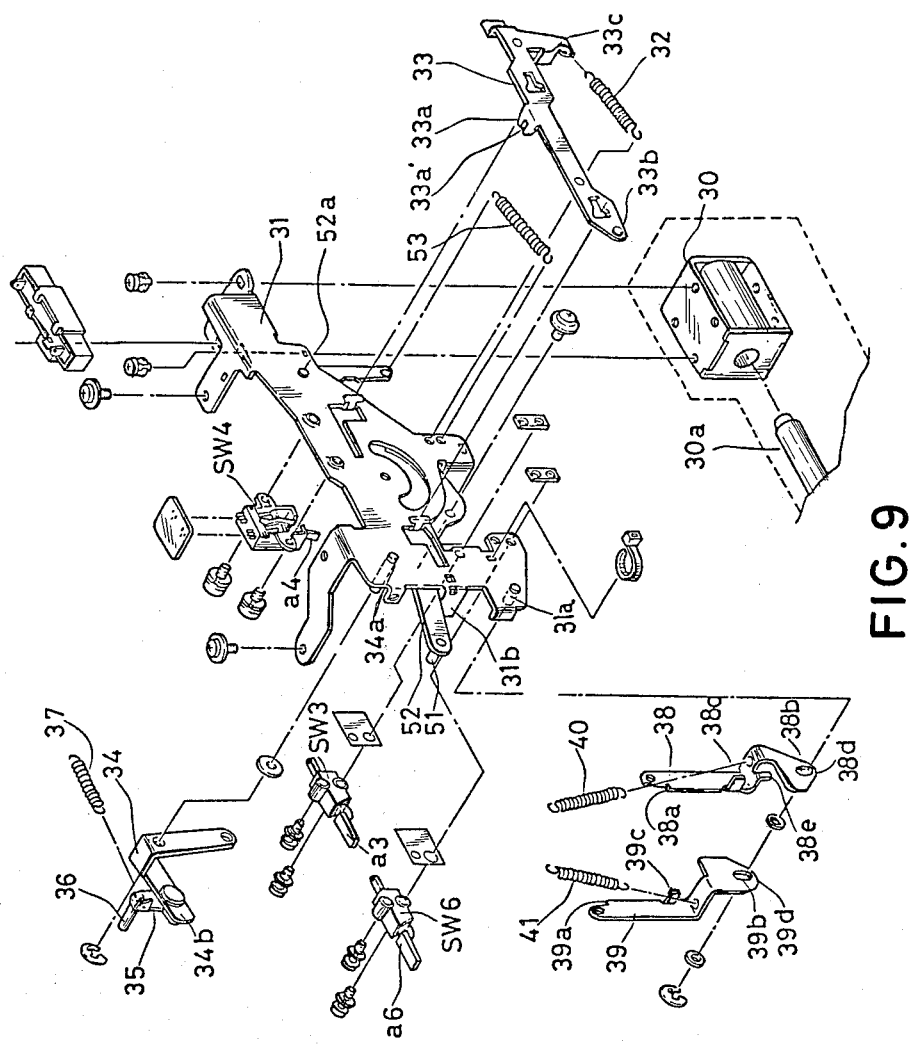
FIG. 9 is an exploded perspective view of the cassette ejecting assembly.

It is understood that loading of the cassette may be operatively interlocked with ejecting of the cassette. FIG. 7 shows an example of the control circuit useful for another embodiment of the present invention, FIGS. 8(a) and 8(b) show a right side view and a left side view of the alternative embodiment; FIG. 9 is an exploded perspective view and FIGS. 10(a) through 10(d) are views for explanation of the operation of the alternative emvbodiment.

A solenoid 30 is selectively connected to the power supply $V_1$ through a parallel circuit of a pair of switches $SW_5$ and $SW_6$. The switch $SW_5$ is held ON for a period of say 0.5 sec in response to actuation of the operation button.

When the switch $SW_5$ is turned ON to energize the solenoid 30, a magnetic plate 30a is attracted so that the changeover switch $SW_4$ is turned to the reverse rotation side for the motor 16. Furthermore, the switches $SW_3$ and $SW_6$ are properly placed into a conductive state. A mount 31 is provided outside one of the side walls 1 which does not bear the motor 16, which mount 31 has an interlock plate 33 slidable forwardly and backwardly and biased forwardly under the influence of a spring 32 secured on the mount 31. The interlock plate 33 is operatively associated with the magnetic plate 30a and moves backwardly together with the magnetic plate 30a against the spring 32 when the solenoid 30 is energized.

The interlock is further provided with an inwardly extending boss 33a which runs through the mount 31. The changeover switch $SW_4$ is fixed on the mount 31 with an edge portion a4 of a movable contact plate being snugly fitted into a cut portion 33a' of the boss 33a. The interlock plate 33 in a forward position permits the motor 16 to rotate in the positive direction and in a backward position permits the same to rotate in the reverse direction through reversing movement of the movable contact plate.

A rotary plate 34 is held rotatable inside the mount 31 by means of a shaft 34a with its one end coupled rotatably with a tip portion of the interlock plate 33 and its remaining end 34b rotatable downwardly about the shaft 34a upon backward movement of the interlock plate 33.

On the remaining end 34b of the rotary plate 34 there is provided a follower plate 35 one end of which is rotatable forwardly and backwardly with the remaining end thereof bearing an inwardly extending detector plate 36. The detector plate 36 extends to be in contact with the front of a working surface 4d formed on the side portion 4 and is springly biased as follows. A spring 37 interposed between the follower plate 35 and the mount 31 pulls backwardly the remaining end of the follower plate 35, springly deflecting backwardly the detector plate 36. The detector plate 36 passes through the cut portion 1c in the front upper portion of the side wall 1 and the edge portion of the cut portion 1c serves as a stop for limiting backward deflection of the detector plate 36.

The cassette carrier 3 is in the foremost position where no cassette is inserted and the detector plate 36 abuts on the working surface 4d of the side portion 4 in a forward position against the force of the spring 37. Should the cassette carrier 3 be moved backwardly upon insertion of the cassette under the circumstance, the working surface 4d of the side portion 4 also moves backwardly and the detector plate 36 moves backwardly against the spring force of the spring 37. As a result, the detector plate 36 comes to a stop in a position as defined by the cut portion 1c.

During ejection whereby the cassette as well as the cassette carrier 3 is returned to the operating position, the working surface 4d of the side portion 4 comes into contact with the detector plate 36 defining the stop position as the carrier 3 moves forwardly, thus advancing the detector plate 36 against the force of the spring 37. As long as switch means are provided to deenergize the motor 16 when the detector 36 proceeds by a predetermined distance, it is possible to stop the cassette carrier 3. A front side edge portion of the cut portion 1c serves as a stop for limiting forward deflection of the detector plate 36 and prevents the cassette carrier 3 from further proceeding over a desired extent.

The detector plate 36 moves up and down with up- and down-movement of the remaining end of the follower plate 35. The remaining end 35a and thus the detector plate 36 is in a lower position when the solenoid 30 is energized. The detector plate 36 in this position may move forwardly and backwardly in response to the forward and backward movement of the cassette carrier 3 as stated previously. An interlock plate 38 has at its upper front portion a cut portion forming a bearing surface 38a on which the detector 36 is seated, while an interlock plate 39 has at its upper rear end portion a cut portion forming a bearing surface 39a on which the detector plate 36 is seated. The interlock plates 38 and 39 are held movable in a vertical direction and rotatable on a lower front portion of the mount 31. Elongated slots 38b and 39b in the lowest ends of the interlock plates 38 and 39 extending in a vertical direction are freely fitted around an inwardly extending shaft 31a on the lowest end of the mount 31.

A pair of springs 40 and 41 is provided between central portions of the interlock plates 38 and 39 and an upper portion of the mount 31, with the interlock plate 38 urged upwardly to be turned forwardly by the spring 40 and the interlock plate 39 urged upwardly to be turned backwardly by the spring 41.

Furthermore, outwardly extending bosses 38c and 39c are formed in the cental portions of the interlock plates 38 and 39, while an inwardly and vertically extending stop 31b is formed in a cental front portion of the mount 31. Although being urged in a forward direction by the spring 40, the interlock plate 38 is held in proper position and prevented from forwardly turning with the front side of the boss 38c in contact with the rear side of the stop 31b. The interlock plate 39, on the other hand, is held in proper position and prevented from turning backwardly with the rear side of the boss 39c in contact with the front side of the stop 31b although the spring 41 tries to force backwardly the interlock plate 39.

When the carrier 3 is in the position not to insert the cassette and the detector plate 36 is brought into given position by the working surface 4a of the side portion 4, the bearing surface 39a of the interlock plate 39 is immediately below the detector plate 36. If the detector plate 36 in this position falls upon energization of the solenoid 30, then the detector plate 36 forces via the bearing surface 39a the interlock plate 39 into a lower position against the force of the spring 41. When the carrier 3 moves backwardly upon insertion of the cassette and the detector plate 36 moves backwardly of the bearing surface 39a, the interlock plate 39 returns to its upper position under the influence of the spring 41. With the detector plate 36 in a stop position, for example, with the carrier 3 in operating position as well as the cassette, the bearing surface 38a of the interlock plate 38 is placed just below the detector plate 36. Provided that the detector plate 36 in the stop position begins falling upon energization of the solenoid 30, the detector plate 36 brings the interlock plate 38 into a lower position against the force of the spring 40. Upon the ejection instruction the cassette carrier 3 moves forwardly as well as the cassette so that the detector plate 36 also moves forwardly against the force of the spring 37. Eventually if the detector plate 36 moves out of the bearing surface 38a, then the interlock plate 39 returns to its upper position by the action of the spring 40.

The interlock plate 38 has a downwardly extending working surface 38e at its central portion and a working surface 38d at its lowest end, while the other interlock plate 39 has a working surface 39d at its lowest end. The actuator plate $a_3$ of the switch $SW_3$ resting on the mount 31 is held in contacting relationship with the working surface 38e and the equivalent of the switch $SW_6$ is held in contacting relationship with the working surfaces 38d and 39d.

It is noted that the switches $SW_3$ and $SW_6$ are turned ON via its actuator plates $a_3$ and $a_6$ with the interlock plate 38 in a lower position and turned OFF with the same in upper home position. Moreover, the switch $SW_6$ is turned ON via its actuator plate $a_6$ with the interlock plate 39 in a lower position and turned OFF with the same being in an upper position. Prior to loading of the cassette 3 the detector plate 36 is located immediately above the bearing surface 39a of the interlock plate 39 as seen from FIG. 10(a).

Figure 10A:
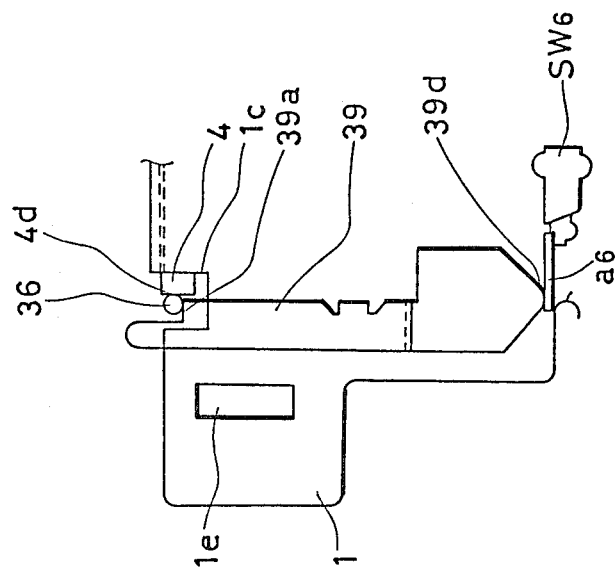
FIGS. 10(a) through 10(d) are views for explanation of the operation of the cassette ejecting assembly.
Figure 10B:
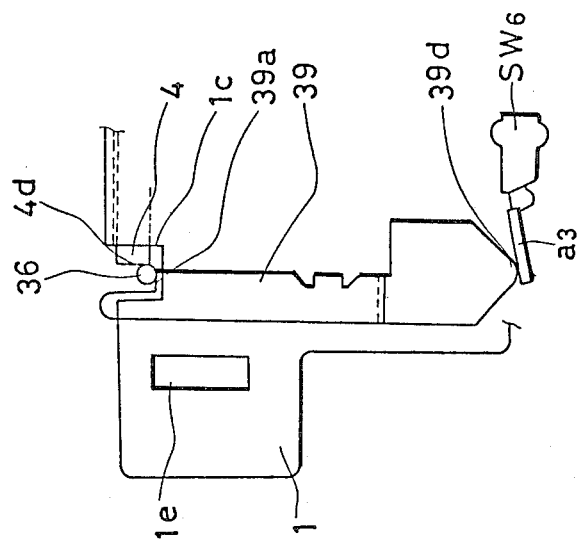
Figure 10:
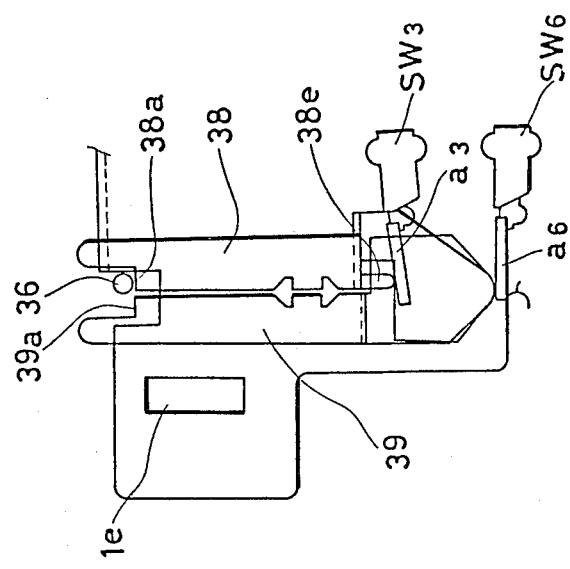
Figure 10:
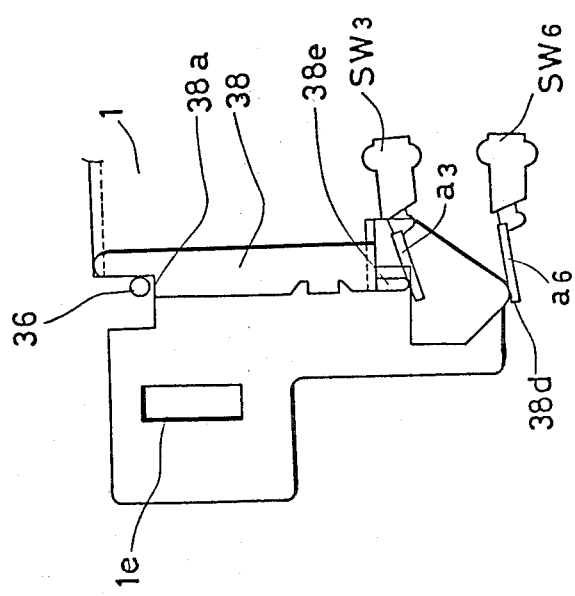

Upon actuation of the operation button the switch $SW_5$ is turned ON and held under this condition for 0.5 sec where the solenoid 30 is energized. Therefore the solenoid 30 becomes operative to lower the detector plate 36 and thus the interlock plate 39. The result is shown in FIG. 10(b) where the switch $SW_6$ is turned ON and self-sustaining current flows through the solenoid 30 via a resistor R for holding this situation. Although the changeover switch $SW_4$ has been turned to the reverse rotation side under the circumstance, the motor 16 is never energized because of the switches $SW_3$, $SW_1$ and $SW_2$.

If the cassette is inserted backwardly of the inlet port and received with the carrier 3 abutting on the stop 3c, then further backward movement permits the carrier 3 to move backwardly.

In response to the force of the spring 37 the detector plate 36 slides on the bearing surface 39a and moves backwardly of the bearing surface. When the interlock plate 39 is released from the pressure of the detector plate 36, it returns upwardly in response to the spring 41, turning OFF the switch $SW_6$. In sliding backwardly of the detector plate 36, the interlock plate 38 can move backwardly against the spring 40 even though the interlock plate 38 is contacted.

Due to switching OFF of the switch $SW_6$ the self-sustaining current flows no longer through the solenoid 30 so that the detector plate 36 rises above the bearing surface 38a of the interlock plate 38. If the cassette carrier 3 further moves backwardly, then the detector plate 36 moves backwardly above the bearing surface 38a of the interlock plate 38 as seen from FIG. 10(c).

If the cassette resting on the carrier 3 is pushed into fixed position, then the switch $SW_1$ is turned ON to thereby activate the motor 16 so that the carrier 3 bearing the cassette begins moving backwardly with rotation of the motor 16 in the positive direction. It is noted that the solenoid 30 is not energized and the changeover switch $SW_4$ is turned to the positive rotation side at this time.

Once the carrier 3 with the cassette moves backwardly and then downwardly, the switch $SW_2$ is turned ON before the switch $SW_1$ is turned OFF so that the carrier falls to the operating position. The result is that the switch $SW_2$ is turned OFF to deenergize the motor 16. The cassette is therefore held in operating position. Under the circumstance steps necessary for playing or recording are carried out. At this time the detector plate 36 is located just above the bearing surface 38a of the interlock plate 38 as seen from FIG. 10(c).

Upon depression of the operation button the switch $SW_5$ is held ON for 0.5 sec whereupon the solenoid 30 is energized to move down the detector plate 36 and depress the interlock plate 38 via the bearing surface 38a as seen from FIG. 10(d). The switch $SW_4$ is turned ON and the solenoid 30 is self-sustained. At the same time the switch $SW_3$ is turned ON and the changeover switch $SW_4$ is turned to the reverse rotation side.

As a result, the motor 16 is energized via the switch $SW_3$ and the switch $SW_4$ on the reverse rotation side, rotating in the reverse direction.

Upon the reverse rotation of the motor 16 the cassette carrier 3 with the cassette moves upwardly and then forwardly and, when the working surface 4d abuts on the detector plate 36, moves forwardly on the bearing surface 38a of the interlock plate 38. The forward movement of the interlock plate 36 forces the interlock plate 39 against the lower rear end of the bearing surface 39a, turning forwardly the interlock plate 39 against the spring 41. When the detector plate 36 moves out of the bearing surface 38a, the interlock plate 38 is hoisted by the force of the spring 40, turning OFF the switches SW₃ and SW₆.

With the switch SW₃ in the OFF position, the motor 16 is no longer energized so that the cassette carrier 3 discontinues moving forwardly whereby the cassette is easily removable via the inlet port.

The switch SW₆ in the OFF position interrupts the power supply to the solenoid 30 so that the detector plate 36 moves upwardly and the interlock plate 39 is released from pressure of the detector plate 36 and turned backwardly under the influence of the spring 41. The bearing surface 39 is returned beneath the detector plate 36 as seen from FIG. 10(a).

Under the condition where no cassette is seated on the carrier 3 or prior to loading of the cassette the switch SW₆ is turned ON via the interlock plate 39 and the solenoid 30 is placed into self-sustaining state upon actuation of the operation button.

It is preferable to provide a door in regard to the inlet port in the above illustrated embodiment and hold the door in closed position except when the cassette is to be inserted or removed. To this end the door 50 is installed to expose to the inlet port by fitting a bearing hole 50a on its opposite sides around the inwardly extending shaft 1d on the upper forward end of the side wall 1 for rotation. An elongated slot 50b is formed in the side portion of the door 50, extending along the radial direction of the bearing hole 50a. A pin 51 is freely fitted into the elongated slot 50b and fixed on a tip portion of a lever, passing through the vertically extending elongated hole 1e in the upper forward end of the side wall 1.

The lever 52 is held rotatable on the rear of the mount 31 by means of a shaft 52a, with its remaining end connected via a spring 53 to the mount 31. The lever 52 is biased with the spring 53 to urge the pin 51 upwardly and place the door 50 into closed position in regard to the inlet port.

The interlock plate 33 has a boss 33c which engages with the remaining end of the lever 52. With the solenoid 30 energized and moved in a backward position, the remaining end of the lever 53 is turned backwardly via the boss 3c against the spring 53 and the pin 51 is biased downwardly. Accordingly, the door 50 opens the inlet port.

Upon actuation of the operation button prior to loading of the cassette the solenoid 30 is energized and the interlock plate 33 is moved backwardly, thus permitting opening of the inlet port for insertion of the cassette. At the same time since the switch SW₆ is turned ON and the solenoid 30 is self-sustained the door 50 is still held in the open position for insertion of the cassette. Once the cassette has been inserted the switch SW₆ is turned OFF and the solenoid 30 is released from the self-sustaining state. The door 50 moves in the closing direction in response to the force of the spring 58. Though the door 50 comes into contact with the top surface of the cassette being inserted, the inlet port is closed after the cassette is inserted fully and the door 50 is out of the top surface.

Since the door 50 is in the open position unless the cassette is inserted, the upper limit of open time is established. For example, a timer switch which is in ON position for about 10 sec after the switch SW₆ is turned ON is connected in series with the switch SW₆ so that the solenoid is free of the self-sustaining state upon the passage of 10 sec and the door 50 is closed.

When the cassette is in operating position and the operation button is depressed to issue the ejection instruction, the solenoid is forced into the self-sustaining state and the door is in open position until the switch SW₆ is turned OFF. Therefore, provided that the cassette reaches the accessible position without touching the door 50 to turn OFF the switch SW₆, the door 50 moves in the closing direction by the force of the spring 53 and contacts the top surface of the cassette. After the cassette is removed from the inlet port, the door 50 fully closes the inlet port under the influence of the spring 53.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A cassette loading apparatus for a front-loading tape recorder comprising:
   a housing having side walls and a front portion, an opening being provided in said front portion for horizontally inserting a cassette;
   a cassette carrier for operatively receiving said cassette, said cassette carrier being movably mounted relative to said housing between an insert position to an operative position and between an operative position to an eject position;
   at least one fixed guide being mounted on said side wall;
   horizontal and vertical guide grooves being disposed in said fixed guide;
   a guide boss being operatively attached to said cassette carrier for slidable engagement with said horizontal guide groove;
   a movable guide being slidable mounted within said vertical guide groove;
   a horizontal guide groove being disposed within said movable guide;
   drive means for providing a drive force for moving said cassette carrier between said insert position to said operative position and from said operative position to said eject position;
   control means for sequentially operating said drive means for automatically moving said cassette carrier to said operative position after a cassette is inserted therein and for automatically moving said cassette carrier to said eject position upon actuation of an eject signal;
   upon insertion of a cassette within said cassette carrier, said cassette carrier being confined to be sequentially in horizontal sliding contact with said guide boss being disposed in said horizontal guide in said fixed guide, in horizontal sliding contact with said guide boss being disposed in said horizontal guide groove in said movable guide and in vertical sliding contact with said movable guide being disposed within said vertical guide groove.

2. A cassette loading apparatus according to claim 1, and further including a spring operatively mounted on said cassette carrier for biasing a cassette in a downward direction.

3. A cassette loading apparatus according to claim 1, and further including at least one stop being positioned on said cassette carrier for accurately positioning a cassette thereon.

4. A cassette loading apparatus according to claim 1, wherein said control means includes a first switch actuated upon insertion and initial horizontal movement of a cassette into said cassette carrier and deactuated when said cassette carrier is in said operative position.

5. A cassette loading apparatus according to claim 1, wherein said movable guide includes a rack disposed on a horizontal surface thereof and said guide boss includes a side wall with a rack disposed on a horizontal surface thereof, said drive means including a pinion operatively connected to said horizontal racks for imparting relative motion therebetween.

6. A cassette loading apparatus according to claim 1, wherein said drive means includes a reversible motor for moving said cassette carrier from said insert position to said operative position and for returning said cassette carrier from said operative position to said eject position.

7. A cassette loading apparatus according to claim 2, wherein said control means includes a second switch for deactuating said drive means when said cassette carrier is in said operative position.

* * * * *

UNITED STATES PATENT AND TRADEMARK OFFICE
CERTIFICATE OF CORRECTION

PATENT NO. : 4,424,540
DATED : January 3, 1984
INVENTOR(S) : Akira NAOI

It is certified that error appears in the above-identified patent and that said Letters Patent are hereby corrected as shown below:

In the Heading of the Patent, under "Foreign Application Priority Data," change

"Apr. 30, 2980 [JP]   Japan..................55-59162" to

--Apr. 30, 1980 [JP]   Japan..................55-59162--.

Signed and Sealed this

First Day of May 1984

[SEAL]

Attest:

Attesting Officer

GERALD J. MOSSINGHOFF

Commissioner of Patents and Trademarks